United States Patent
Kosaka

(10) Patent No.: US 12,523,533 B2
(45) Date of Patent: Jan. 13, 2026

(54) BOLOMETER AND METHOD FOR MANUFACTURING SAME

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 239 days.

(21) Appl. No.: 18/201,540

(22) Filed: May 24, 2023

(65) Prior Publication Data

US 2023/0384166 A1     Nov. 30, 2023

(30) Foreign Application Priority Data

May 27, 2022 (JP) .................................. 2022-086622

(51) Int. Cl.
    *G01J 5/22*          (2006.01)
    *G01J 5/20*          (2006.01)
    *H10N 15/10*      (2023.01)

(52) U.S. Cl.
CPC ................ *G01J 5/22* (2013.01); *H10N 15/15* (2023.02); *G01J 2005/202* (2013.01)

(58) Field of Classification Search
None
See application file for complete search history.

(56) References Cited

U.S. PATENT DOCUMENTS

2011/0203632 A1* 8/2011 Sen .................... H10F 10/16
                                                    438/92
2022/0109076 A1* 4/2022 Yuge .................. H10F 77/14

FOREIGN PATENT DOCUMENTS

| JP | 2015-049207 A | 3/2015 | |
|----|----|----|----|
| WO | 2012/049801 A1 | 4/2012 | |
| WO | WO-2020158455 A1 * | 8/2020 | .............. G01J 5/023 |

* cited by examiner

*Primary Examiner* — Edwin C Gunberg

(74) *Attorney, Agent, or Firm* — Sughrue Mion, PLLC

(57) ABSTRACT

One object of the present invention is to provide a bolometer having low resistance.

The present invention relates to a bolometer including two electrodes and a bolometer film lying between the two electrodes to connect the two electrodes, wherein the bolometer film includes semiconducting carbon nanotubes in a proportion of 90% by mass or more to the total amount of carbon nanotubes and includes p-type semiconducting carbon nanotubes, and one or both of the two electrodes include(s) a monometal or alloy having lower work function than the p-type semiconducting carbon nanotubes at least in a part of the electrode.

10 Claims, 14 Drawing Sheets

(a)

(b)

(c)

(d)

(e)

(f)

(g)

(h)

(i)

(j)

(k)

(l)

(m)

(n)

(o)

(p)

BOLOMETER AND METHOD FOR MANUFACTURING SAME

This application is based upon and claims the benefit of priority from Japanese patent application No. 2022-086622, filed on May 27, 2022, the disclosure of which is incorporated herein in its entirety by reference.

TECHNICAL FIELD

The present invention relates to a bolometer and a method for manufacturing the same, specifically a bolometer using carbon nanotubes and a method for manufacturing the same.

BACKGROUND ART

Infrared sensors have a very wide range of applications such as not only monitoring cameras for security, but also thermography for human body, in-vehicle cameras, and inspection of structures, foods, and the like, and are thus actively used in industrial applications in recent years. In particular, development of a low-cost and high-performance uncooled infrared sensor capable of obtaining biological information in cooperation with IoT (Internet of Things) is expected. In the known uncooled infrared sensors, $VO_x$ (vanadium oxide) has been mainly used in the bolometer unit, but since a heat treatment under vacuum is required, there had been the problems of high process cost and low temperature coefficient resistance (TCR) thereof (about −2.0%/K).

Since a material having large resistance change against temperature change and high conductivity is required to improve TCR, semiconducting single-walled carbon nanotubes having a large band gap and carrier mobility are expected to be applied to the bolometer unit. Since carbon nanotubes are chemically stable, an inexpensive device manufacturing processes such as printing technology can be applied, and thus, there is a possibility that a low-cost and high-performance infrared sensor can be made.

For example, Patent Document 1 suggests applying typical single-walled carbon nanotubes to a bolometer unit, and producing a bolometer by a low-cost thin film process in which a dispersion liquid is prepared by mixing single-walled carbon nanotubes in an organic solvent utilizing their chemical stability and then is applied on an electrode. In this case, TCR is successfully improved to about −1.8%/K by subjecting single-walled carbon nanotubes to annealing treatment in the air.

Single-walled carbon nanotubes typically contain nanotubes with semiconducting properties and nanotubes with metallic properties in a ratio of 2:1, and separation is thus required. In Patent Document 2, since metallic and semiconducting components are present in a mixed state in single-walled carbon nanotubes, semiconducting single-walled carbon nanotubes of uniform chirality are extracted using an ionic surfactant and applied to the bolometer unit, and TCR of −2.6%/K is thereby successfully achieved.

CITATION LIST

Patent Literature

Patent Document 1: WO 2012/049801
Patent Document 2: Japanese Patent Laid-Open No. 2015-49207
Patent Document 3: WO 2020/158455

SUMMARY OF INVENTION

Technical Problem

However, not only improvement in TCR, but also improvement in characteristics such as resistance reduction is needed for implementation of CNT non-cooling infrared sensors. What type of electrodes carbon nanotubes are jointed to is important for resistance reduction for bolometer units. As described in Patent Document 3, for example, if a gold electrode is provided on a carbon nanotube film on a substrate in a bolometer with carbon nanotubes, ohmic junctions are formed between the electrode and the carbon nanotube film. Such bolometers tend to exhibit high resistance values in spite of their highly symmetrical linear IV characteristics, and hence bolometers having low resistance are desired.

Accordingly, an object of the present invention is to provide a bolometer having low resistance and a production method therefor.

Solution to Problem

One aspect of the present invention relates to:
a bolometer comprising two electrodes and a bolometer film lying between the two electrodes to connect the two electrodes,
wherein the bolometer film comprises semiconducting carbon nanotubes in a proportion of 90% by mass or more to the total amount of carbon nanotubes and comprises p-type semiconducting carbon nanotubes, and
one or both of the two electrodes comprises a monometal or alloy having lower work function than the p-type semiconducting carbon nanotubes at least in a part of the electrode.

Another aspect of the present invention relates to:
a bolometer comprising two electrodes and a bolometer film lying between the two electrodes to connect the two electrodes,
wherein the bolometer film comprises n-type semiconducting carbon nanotubes, and
one or both of the two electrodes comprise(s) a monometal or alloy having higher work function than the n-type semiconducting carbon nanotubes at least in a part of the electrode.

Another aspect of the present invention relates to:
a method for producing a bolometer comprising two electrodes and a bolometer film lying between the two electrodes to connect the two electrodes, the method comprising:
producing a bolometer film comprising semiconducting carbon nanotubes in a proportion of 90% by mass or more to the total amount of carbon nanotubes and comprising p-type semiconducting carbon nanotubes; and producing two electrodes, before or after the step of producing the bolometer film, in such a manner that the two electrodes connect to the bolometer film, wherein one or both of the two electrodes comprise(s) a monometal or alloy having lower work function than the p-type semiconducting carbon nanotubes at least in a part of the electrode.

Another aspect of the present invention relates to:

a method for producing a bolometer comprising two electrodes and a bolometer film lying between the two electrodes to connect the two electrodes, the method comprising:

converting carbon nanotubes each into an n-type semiconductor;

producing a bolometer film comprising n-type semiconducting carbon nanotubes; and producing two electrodes, before or after the step of producing the bolometer film, in such a manner that the two electrodes connect to the bolometer film, wherein one or both of the two electrodes comprise(s) a monometal or alloy having higher work function than the n-type semiconducting carbon nanotubes at least in a part of the electrode.

Advantageous Effect of Invention

According to the present invention, a bolometer with low resistance can be provided.

DESCRIPTION OF EMBODIMENTS

The present inventors have found that a bolometer film with semiconducting carbon nanotubes that are each a p-type semiconductor in their natural states, when being connected to an electrode containing a metal having lower work function than the p-type semiconducting carbon nanotubes, exhibits highly asymmetrical IV characteristics as IV characteristics in use as an element through the formation of Schottky junctions between the bolometer film and the electrode (FIGS. 6 and 7), and that an element that exhibits such Schottky-type IV allows high currents to flow at high voltages, which leads to successful resistance reduction for bolometers.

While carbon nanotubes are each a p-type semiconductor in their natural states, they can be each transformed into an n-type semiconductor as described later. Similarly to the case with p-type semiconducting carbon nanotubes, a bolometer film with semiconducting carbon nanotubes that are each an n-type semiconductor, when being connected to an electrode containing a metal having higher work function than the n-type semiconducting carbon nanotubes, allows the formation of Schottky junctions between the bolometer film and the electrode, which leads to successful resistance reduction for bolometers.

Figure 11:
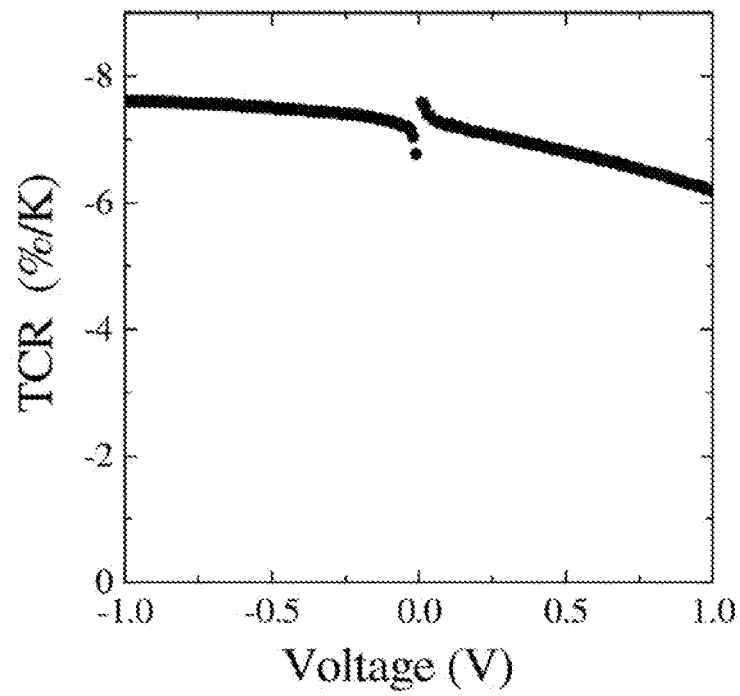
FIG. 11 is a graph showing TCR for an example in Examples.
Figure 12:
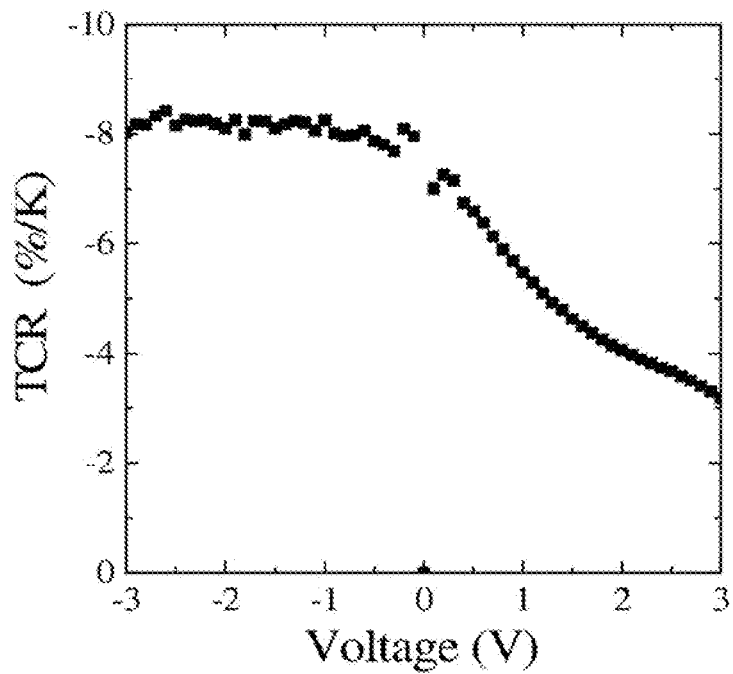
FIG. 12 is a graph showing TCR for an example in Examples.

The present inventors have found that, in an embodiment, in the case that the proportion of the metal having lower work function than the p-type semiconducting carbon nanotubes is low, specifically, in the case that the proportion of the metal having lower work function than the carbon nanotubes in metals constituting contact sites of the electrodes with the bolometer film is 10% by mass or less, or that the contact area between the metal having lower work function than the carbon nanotubes and the bolometer film is 10% or less of the total contact area between the electrode and the bolometer film, a Schottky-type IV component overlaps with an ohmic linear IV component to give more linear IV than typical Schottky-type IV (FIGS. 8 and 9), and such a mode provides particularly high TCR in a broad voltage region (FIGS. 11 and 12).

Similarly to the case with p-type semiconducting carbon nanotubes, a bolometer film with n-type semiconducting carbon nanotubes gives particularly high TCR in a broad voltage region through the use of a low proportion of a higher-work-function metal.

[Structure of Bolometer]

Figure 1:
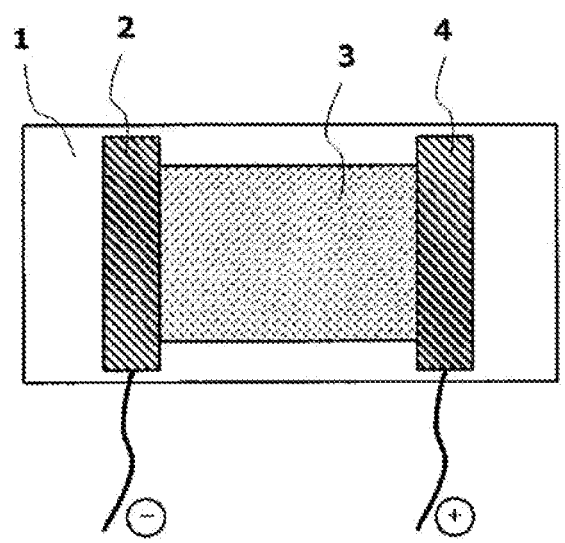
FIG. 1 is a schematic diagram (plan view) showing the structure of a bolometer according to one embodiment of the present invention.

FIG. 1 is a schematic diagram illustrating an example of a bolometer of the present embodiment. The bolometer of the present embodiment comprises: a first electrode 2 and a second electrode 4 on a substrate 1; and a bolometer film 3 containing carbon nanotubes, wherein the bolometer film 3 connects the first electrode 2 and the second electrode 4.

Herein, a bolometer film with p-type semiconducting carbon nanotubes is a bolometer film such that semiconducting carbon nanotubes in the bolometer film are composed mainly of p-type semiconducting carbon nanotubes. The proportion of the p-type semiconducting carbon nanotubes in the semiconducting carbon nanotubes of the bolometer film is preferably 95% by mass or more, more preferably 98% by mass or more, and particularly preferably 100% by mass.

However, if some of the p-type semiconducting carbon nanotubes are replaced with n-type semiconducting carbon nanotubes for the purpose of obtaining IV characteristics such that a Schottky-type IV component is overlapping with an ohmic linear IV component as described later in Embodiment (4), a numerical value lower than the aforementioned numerical range may be employed as the proportion of the p-type semiconductor carbon nanotubes.

A bolometer film with n-type semiconducting carbon nanotubes is a bolometer film such that semiconducting carbon nanotubes of the bolometer film are composed mainly of n-type semiconducting carbon nanotubes. The proportion of the n-type semiconducting carbon nanotubes in the semiconducting carbon nanotubes of the bolometer film is preferably 95% by mass or more, and more preferably 98% by mass or more (including 100% by mass). However, if some of the n-type semiconducting carbon nanotubes are replaced with p-type semiconducting carbon nanotubes for the purpose of obtaining IV characteristics such that a Schottky-type IV component is overlapping with an ohmic linear IV component as described later in Embodiment (4), a numerical value lower than the aforementioned numerical range may be employed as the proportion of the n-type semiconducting carbon nanotubes.

Herein, a bolometer film with p-type or n-type semiconducting carbon nanotubes is occasionally referred to as a "carbon nanotube film" or a "carbon nanotube layer".

(Electrodes)

Metals to be used for electrodes in the bolometer of the present embodiment and the structure of the electrodes will be described.

Metal Constituting Electrodes

Examples of monometals having lower work function than the p-type semiconducting carbon nanotubes that are used for the electrodes to be connected to the p-type semiconducting carbon nanotube film include titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

Alternatively, an alloy may be used for the electrodes to be connected to the p-type semiconducting carbon nanotube film, and in this case the work function of the alloy is needed to be lower than those of the p-type semiconducting carbon nanotubes. Examples of such alloys include an alloy of two or more, such as three or more, metals selected from the aforementioned metals having lower work function than the p-type semiconducting carbon nanotubes, and an alloy containing any of those metals together with a certain amount of another metal.

Examples of monometals having higher work function than the n-type semiconducting carbon nanotubes that are used for the electrodes to be connected to the n-type semiconducting carbon nanotube film include gold, platinum, copper, cobalt, nickel, carbon, and palladium.

Alternatively, an alloy may be used for the electrodes to be connected to the n-type semiconducting carbon nanotube film, and in this case the work function of the alloy is needed to be higher than those of the n-type semiconducting carbon nanotubes. Examples of such alloys include an alloy of two or more, such as three or more, metals selected from the aforementioned metals having higher work function than the n-type semiconducting carbon nanotubes, and an alloy containing any of those metals together with a certain amount of another metal.

The following describes electrodes containing a monometal or alloy having lower work function than p-type semiconducting carbon nanotubes for use in connecting to a p-type semiconducting carbon nanotube film, as an example; if an n-type semiconducting carbon nanotube film is used for the bolometer film, the phrase "a monometal or alloy having lower work function" is read as "a monometal or alloy having higher work function", and the phrase "a monometal or alloy having higher work function" is read as "a monometal or alloy having lower work function".

As described above, metals that may be combined to form the electrodes for a p-type semiconducting carbon nanotube film and those for an n-type semiconducting carbon nanotube film are different. Accordingly, use of an n-type semiconducting carbon nanotube film in place of the p-type semiconducting carbon nanotubes gives more choices of metals, and may allow selection of metals suitable for physical properties required for the electrodes.

Herein, a monometal or alloy with the work function being lower than those of carbon nanotubes (4.6 to 4.8 eV) is occasionally referred to as "a lower-work-function monometal or alloy", simply.

The term "metal" is occasionally used as a collective term for monometals and alloys. If two or more metals are used for an electrode in the following description, any of a combination of monometals, a combination of a monometal(s) and an alloy(s), and a combination of alloys may be used as long as the combination has required work function.

The bolometer of the present embodiment includes at least two electrodes, and at least one of the two electrodes contains a lower-work-function metal at least in a part of the electrode. That is, both the two electrodes may contain a lower-work-function metal, and only one of the two electrodes may contain a lower-work-function metal. The whole of an electrode containing a lower-work-function metal may be composed of a lower-work-function metal, and an electrode may contain a lower-work-function metal only in a part of the electrode.

In the case that each of the two electrodes consists only of a monometal, in particular, when p-type semiconducting carbon nanotubes are used, however, it is preferable that each of the two electrodes consist of a lower-work-function monometal.

Figure 6:
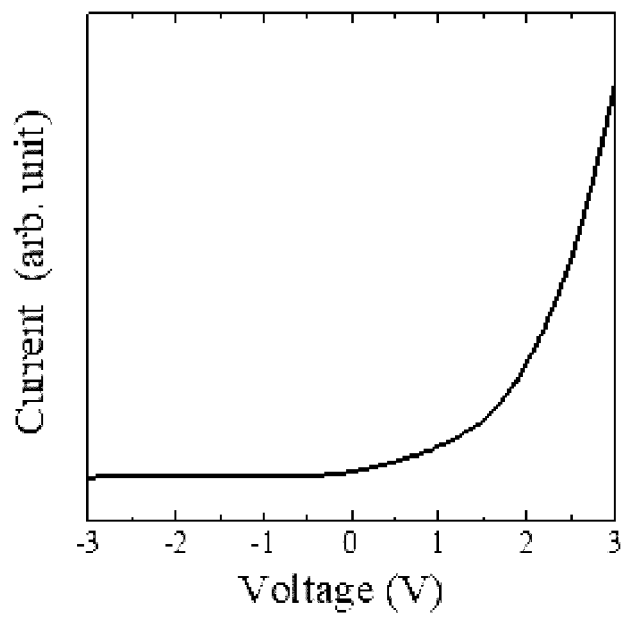
FIG. 6 is a graph showing IV characteristics for an example in Examples.

In the case that either one of the two electrodes contains a lower-work-function metal, or that each of the two electrodes contains a lower-work-function metal in a part of the electrode, elements are allowed to exhibit Schottky-type IV characteristics as shown in FIG. 6, and in this case good resistance reduction effect is provided because high currents flow at high voltages in the positive voltage region.

Figure 7:
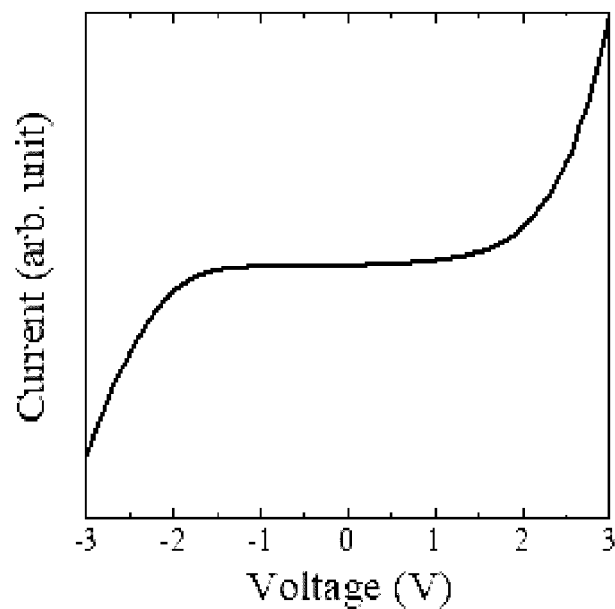
FIG. 7 is a graph showing IV characteristics for an example in Examples.

In the case that each of the two electrode consists only of a lower-work-function metal, elements are allowed to exhibit Schottky-type IV characteristics as shown in FIG. 7, in which high currents flow at high voltages in both the positive and negative voltage regions. This is presumably because carbon nanotubes form Schottky junctions with both of the electrodes. In such elements, resistance reduction is successfully achieved at high voltages in both the positive and negative voltage regions. Consisting only of a lower-work-function metal means that the proportion of the area of the metal in contact with carbon nanotubes is 90% or more.

Therefore, a bolometer according to an embodiment is suitable for use at high voltages in the positive and negative voltage regions or at high voltages in the positive voltage region. Herein, a high voltage is such a voltage that the absolute value of the voltage is preferably 1.5 V or higher, more preferably 2.0 V or higher, even more preferably 2.5 V or higher, or 3.0 V or higher in some cases.

Structure of Electrodes

The structure of the electrode may be any structure in which the carbon nanotube film lies between the two electrodes to connect the two electrodes, without limitation.

For example, a mode as shown by each illustration of FIGS. 2A to 2F and FIGS. 4G to 4P may be employed, in which the bolometer film lies between the two electrodes provided on the substrate to connect the two electrodes. In this case, the electrode wall (hereinafter, also referred to as the "side wall") of each electrode in the carbon nanotube film side is in contact with the carbon nanotube film as shown with a dashed circle in FIG. 2A, whereas each electrode may be in contact with the bolometer film at a part of an upper surface (or a lower surface) of the electrode, for example, as shown with a dashed circle in FIG. 2F and FIG. 4H. The contact surface in which carbon nanotubes and each electrode are in contact may be a vertical surface, an uneven surface, or a smooth curved surface.

Figure 4G:
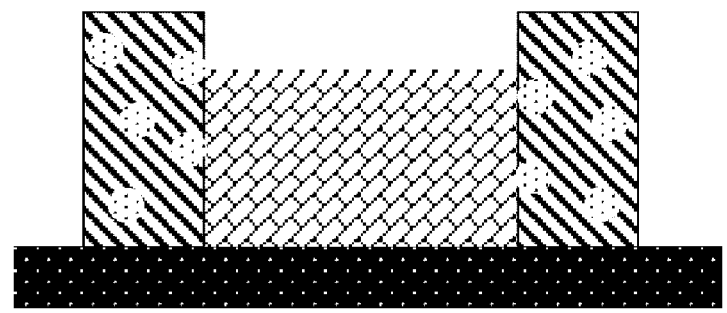
FIGS. 4G to 4P is schematic views (vertical cross-sectional views) illustrating examples of the structure of electrodes in the bolometer of the present invention.
Figure 4H:
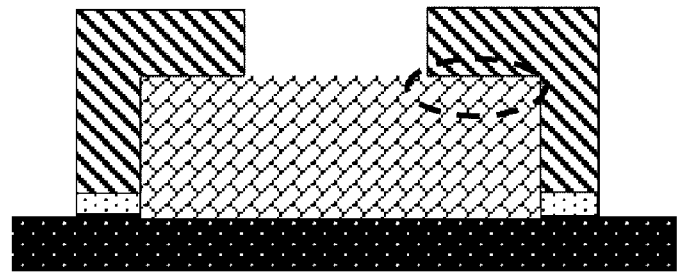
Figure 4I:
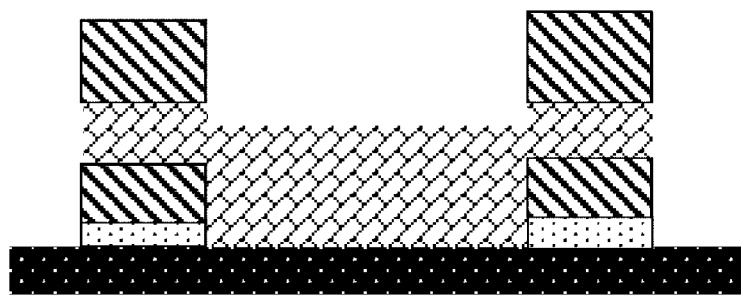
Figure 4J:
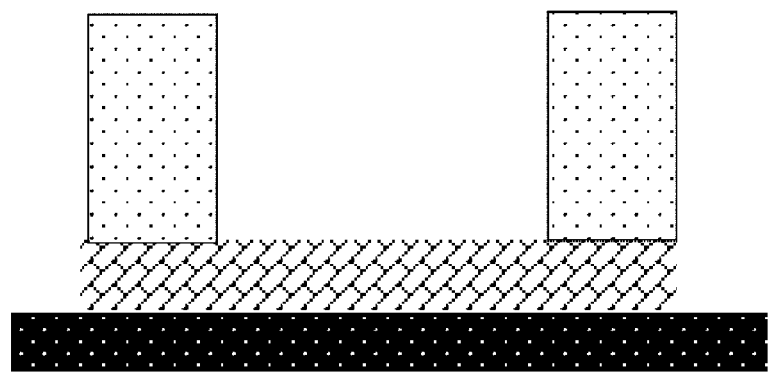
Figure 4K:
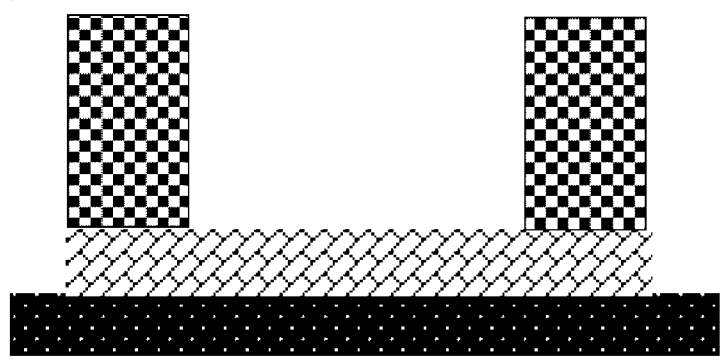

Alternatively, as shown in FIG. 4J and FIG. 4K, the two electrodes may be provided with a space therebetween on the bolometer film formed on the substrate.

In an embodiment, it is preferable that at least one of the electrodes be composed of two or more metals. In the case that an electrode is composed of two or more metals, the electrode may contain an alloy of two or more metals and/or be composed of two or more parts consisting of different metals.

In the case that at least one of the electrodes is composed of two or more parts consisting of different metals, for example, the two or more parts can be configured with an electrode in contact with carbon nanotubes of the bolometer film (contact electrode) and an electrode that is not directly connected to carbon nanotubes but connected to a detection terminal (detection electrode). As compared with the configuration in which each electrode consists only of a monometal, the configuration described, in which at least one of the electrodes is composed of two or more metals, has an advantage that a contact electrode that forms good joints with two or all of the substrate, the carbon nanotubes, and the detection electrode can be used.

(1)

In the case that at least one of the electrodes is composed of two or more parts, the form is not limited; for example, the electrode can be composed of two or more layers, and, for example, on a first metal layer (also referred to as the "first layer") formed on the substrate, a second metal layer or subsequent metal layers can be formed.

Figure 2A:
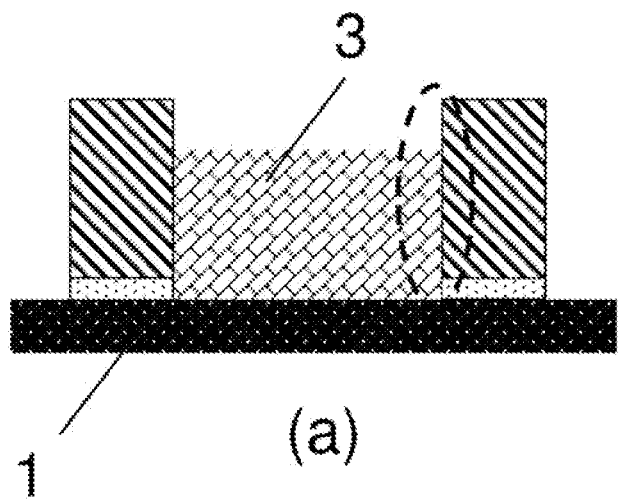
FIGS. 2A to 2F is schematic views (vertical cross-sectional views) illustrating examples of the structure of electrodes in the bolometer of the present invention.
Figure 2B:
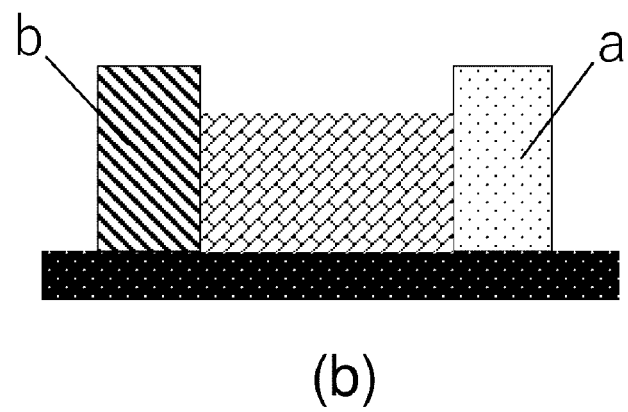
Figure 2C:
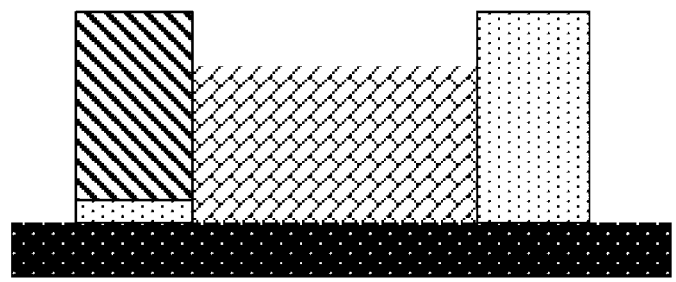
Figure 2D:
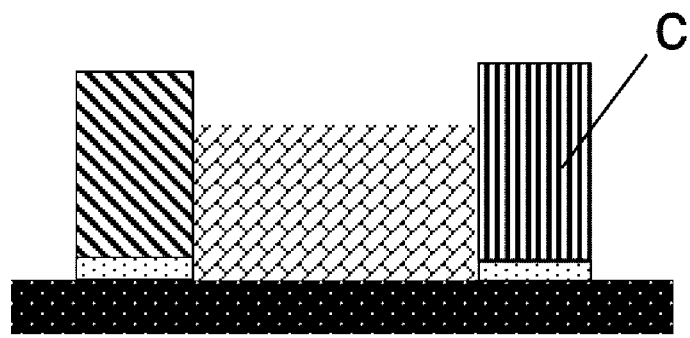
Figure 2E:
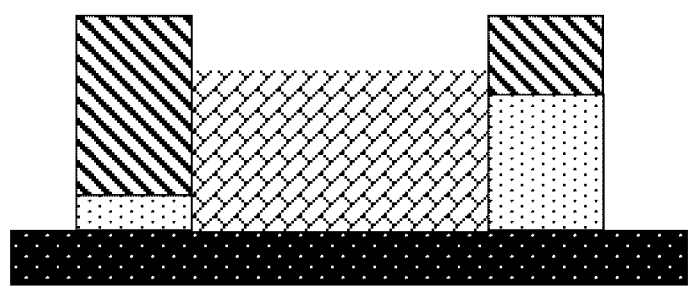
Figure 2F:
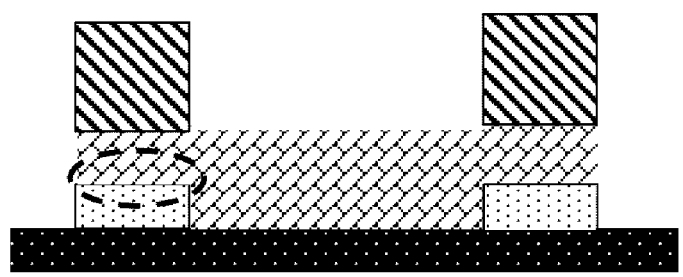
Figure 4L:
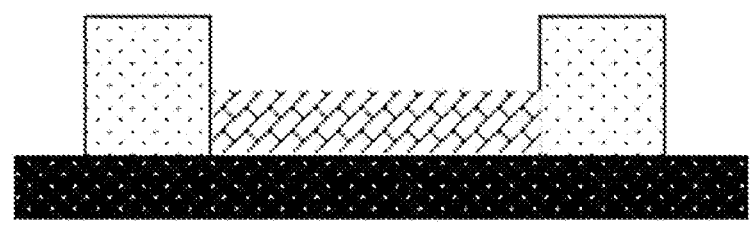
Figure 4M:
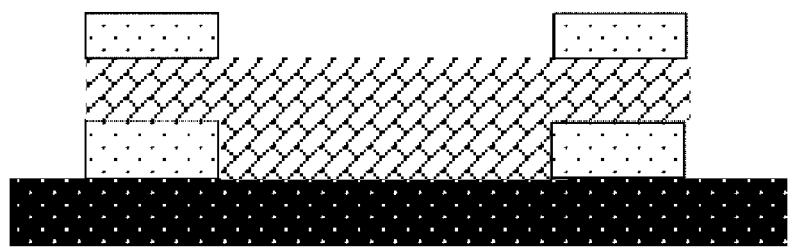
Figure 4N:
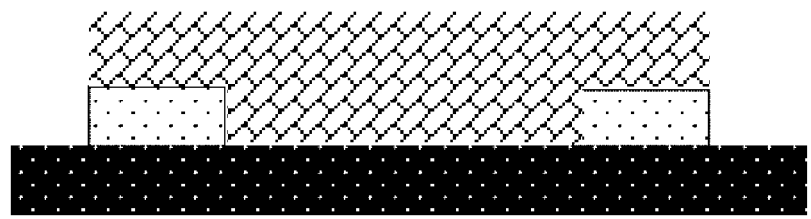

In the case that an electrode is composed of two or more parts, a form as shown in FIG. 2F, FIG. 4I, and FIG. 4M, in which the two or more parts of the electrode and a part of the bolometer film are laminated, may be employed.

In the case that an electrode contains a lower-work-function metal in a part of the electrode, the proportion of the lower-work-function metal is not limited, but the proportion of the area in which the bolometer film and the lower-work-function metal are in contact to the total area in which the bolometer film and the electrode are in contact is preferably 1% or more, more preferably 5% or more, and even more preferably 10% or more. The upper limit is not limited, and the proportion may be 90% or less, for example, 50% or less, or 30% or less in some cases.

In an embodiment, a metal that forms good adhesion to the substrate is preferably used as a first layer to be provided just on the substrate. Examples of such metals include Ti and Cr. The thickness of the first layer is preferably 2 nm or larger and 50 nm or smaller, and more preferably 5 nm or larger and 20 nm or smaller.

For example, Ti, which is a lower-work-function metal that forms good adhesion to substrates, is occasionally used as an adhesion layer that enhances the adhesion between the metal material of an electrode and a substrate in thin-film transistors and the like. In such situations, conventional techniques have not succeeded in forming Schottky junctions between the bolometer film and the adhesion layer even when a lower-work-function metal is used for the adhesion layer, for example, because the thinness of the adhesion layer is small, the bolometer film is formed in such a manner that the bolometer film rides over the two electrodes, and not in contact with the adhesion layer part, and the presence of an impurity component (e.g., a surfactant) in the bolometer film prevents the formation of satisfactory junctions between the adhesion layer and the bolometer film. In an embodiment of the present invention, on the other hand, carbon nanotubes in the bolometer film can be brought into contact with the lower-work-function metal in the first layer of an electrode, for example, by setting the thickness of the first layer to 2 nm or larger to ensure the area of the contact wall that allows the electrode to joint to the bolometer film, as described above, and, as described later, by selecting carbon nanotubes whose shapes and/or forms allow the bolometer film to sufficiently readily come into contact with the substrate and basal regions of the electrodes (i.e., the electrode walls of the first layer), and sufficiently removing a surfactant in the bolometer film. This results in the formation of Schottky junctions between each electrode and the carbon nanotube film, leading to successful resistance reduction.

(2)

As another structure in which an electrode is composed of two or more parts, a structure in which two or more metals are mixing together or a structure in which particles of a first metal are dispersed in a second metal can be given to at least one of parts in contact with the carbon nanotube film among the two or more parts.

An alloy is a metal formed through alloying of two or more metals having different work functions to provide one work function. In the structure in which two or more metals are mixing together, by contrast, two or more metals having different work functions are mixing together and are in contact with the bolometer film in that state (FIG. 4K). As shown in FIG. 6, Schottky junctions can be formed by using a lower-work-function metal for at least one of the two or more metals.

In an embodiment, the proportion of the lower-work-function metal in the two or more metals constituting the parts in contact with the carbon nanotube film can be more than 10% by mass, preferably 20% by mass or more, and more preferably 30% by mass or more.

Examples of methods for producing such electrodes in which two or more metals are mixing together or particles of a first metal are dispersed in a second metal include vapor deposition and a sputtering method with a vapor deposition source containing metals at a specific ratio, a multi-source deposition method, a combinatorial sputtering method, and a multi-source sputtering method.

(3)

Figure 8:
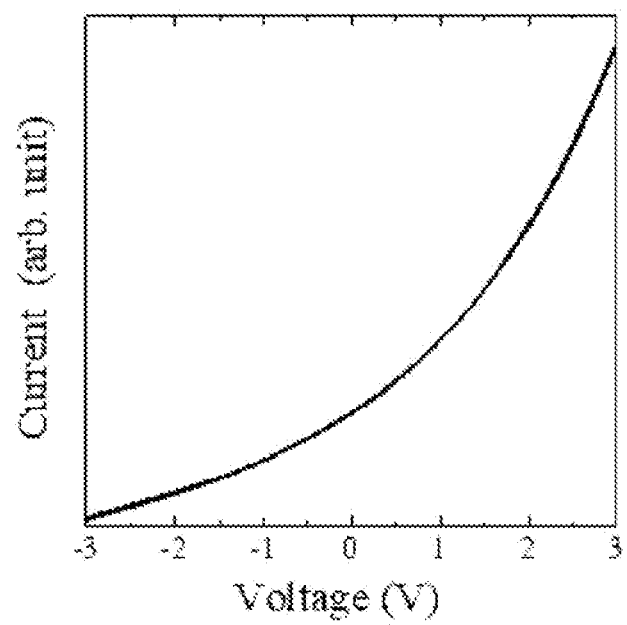
FIG. 8 is a graph showing IV characteristics for an example in Examples.

In an embodiment, use of a metal having lower work function than the carbon nanotubes in a low proportion (also expressed as at an impurity level) results in IV characteristics such that a Schottky component is contained in an ohmic component as shown in FIG. 8, and also in this case resistance reduction effect can be obtained in a high-voltage region. The mode with such an impurity level gives particularly high TCR in a broad voltage region.

(3-1)

Figure 9:
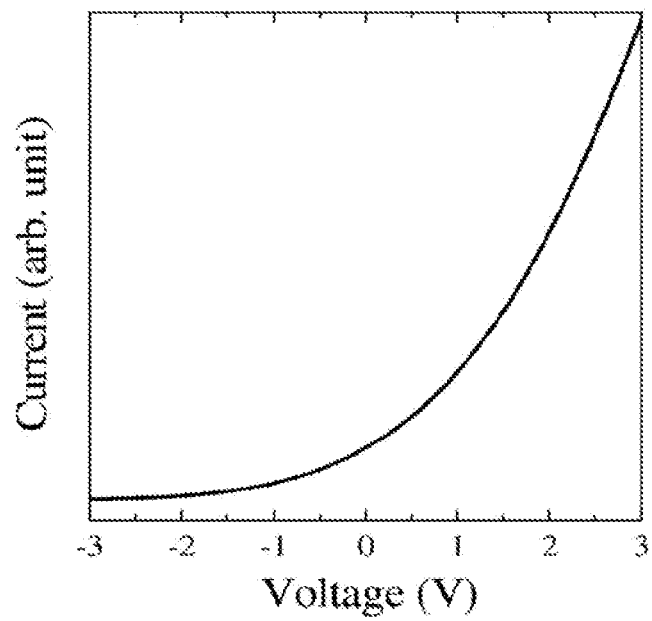
FIG. 9 is a graph showing IV characteristics for an example in Examples.

In an embodiment in the case that either one or both of the two electrodes is composed of two or more parts as in (1) above, the proportion of the area in which the bolometer film and the lower-work-function metal are in contact to the total area in which the bolometer film and an electrode are in contact can be 10% or less, preferably 5% or less, and more preferably 1% or less. The lower limit is not limited, but the proportion is preferably 0.1% or more for resistance reduction. Bolometers with such electrodes exhibit IV more linear than typical Schottky-type IV such that a Schottky-type IV component is overlapping with an ohmic linear IV component as shown in FIGS. 8 and 9. This mode gives not only resistance reduction effect as shown in FIGS. 8 and 9, but also particularly high TCR in a broad voltage region as shown in FIG. 12. The proportion of the lower-work-function metal in the present embodiment may be changed according to metals to be used.

To produce such electrodes, in configuring either one or both of the two electrodes with two or more parts, the two or more parts are appropriately configured in such a manner that the proportion of the area in which the lower-work-function metal is in contact with the bolometer film falls within the above range.

Figure 4O:
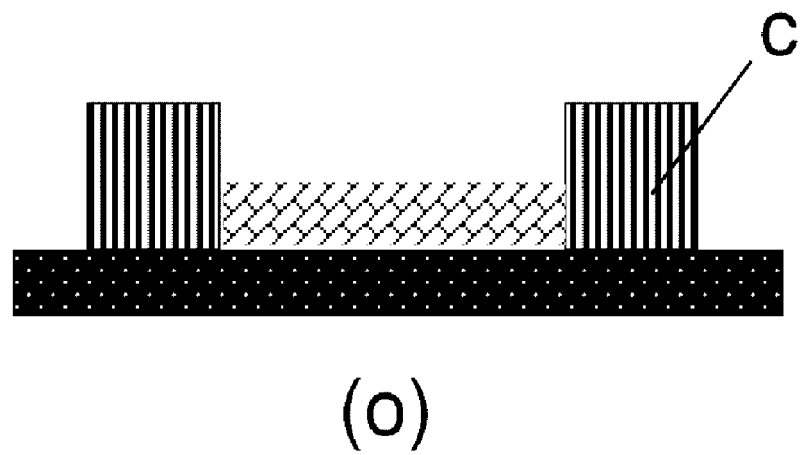
Figure 4P:
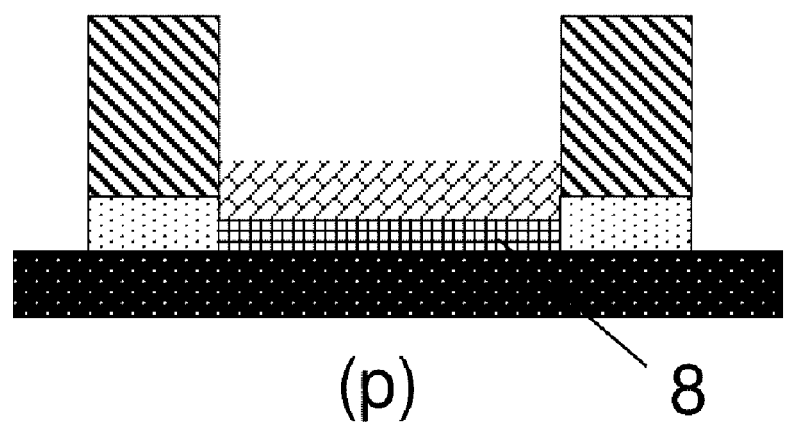

An example of such production methods is a method of providing a layer to prevent the contact between the lower-work-function metal and carbon nanotubes between the layer consisting of the metal and the bolometer film to achieve a configuration in which only a part of the layer consisting of the lower-work-function metal is in contact with carbon nanotubes, as shown in FIG. 4P. Examples of the layer to prevent the contact between the metal and the bolometer film include, but are not limited to, a titanium dioxide layer, an insulating layer made of $SiO_2$, SiN, polyimide, APTES, or the like, and a layer of a conductive material having higher work function than the carbon nanotubes such as carbon, carbon nanohorns, and graphite.

(3-2)

In the case that the structure in which two or more metals mixing together or the structure in which particles of a first metal are dispersed in a second metal, as shown in (2) above, is given to at least one of parts in contact with the carbon nanotube film, the lower-work-function metal may be mixing at an impurity level in parts composed primarily of a metal having higher work function than the carbon nanotubes (FIG. 4G). Mixing at an impurity level is a state in which metals having two or more work functions, the work function of a base metal and the work function of an impurity metal, are mixing together. The proportion of the impurity metal, that is, the metal having lower work function than the carbon nanotubes is 10% by mass or less, preferably 5% by mass or less, and more preferably 1% by mass or less, though the proportion depends on the type of the metal. The lower limit is not limited, but the proportion of the impurity metal is preferably 0.1% by mass or more for resistance reduction. The bolometer of the present embodiment exhibits IV characteristics such that a Schottky component is contained in an ohmic component as shown in FIG. 8, and also in this case resistance reduction effect can be obtained in a high-voltage region. The mode with such an impurity level gives particularly high TCR in a broad voltage region as shown in FIG. 11.

The form of the lower-work-function metal mixing at an impurity level is not limited, and can be, for example, particulate as shown in FIG. 4G, in which at least some of the particles are in contact with the carbon nanotube film.

Examples of methods for producing such electrodes include, as with the case of (2) above, vapor deposition and a sputtering method with a vapor deposition source partially containing an impurity metal, a multi-source deposition method, a combinatorial sputtering method, and a multi-source sputtering method.

(4)

Examples of alternative methods for achieving IV characteristics containing an ohmic component and a Schottky component as shown in FIGS. 8 and 9 include a method of using n-type semiconducting carbon nanotubes in addition to p-type semiconducting carbon nanotubes in the bolometer film with the p-type semiconducting carbon nanotubes. As described above, the relationship of p-type semiconducting carbon nanotubes with the work function of a metal used for an electrode and that of n-type semiconducting carbon nanotubes are reverse to each other. Accordingly, replacing some of the p-type semiconducting carbon nanotubes with n-type semiconducting carbon nanotubes gives IV characteristics containing an ohmic component and a Schottky component.

The proportion of the n-type semiconducting carbon nanotubes is not limited, and can be more than 0% by mass, preferably 2% by mass or more, and more preferably 5% by mass or more to the total of the p-type semiconducting carbon nanotubes and n-type semiconducting carbon nanotubes. For achieving TCR-improving effect in addition to resistance reduction, the proportion of the n-type semiconducting carbon nanotubes can be 90% by mass or more and 99.9% by mass or less.

FIG. 2A to 2F, FIG. 3, and FIG. 4G to 4P show examples of the structure of the electrodes in the bolometer of the present embodiment, though the structure of the electrodes is not limited to them. In the examples in FIGS. 2A to 2F, FIG. 3, and FIGS. 4G to 4P, the lower-work-function metal and the higher-work-function metal may be reversed as long as the lower-work-function metal is contained at least in a part of at least one of the electrodes.

In an embodiment, it is preferable that the two electrodes be structurally identical. If being structurally identical, the two electrodes can be produced at the same time through the same process, which results in a simplified production process.

The distance between the two electrodes is preferably 1 μm to 500 μm, and for miniaturization, it is more preferably 5 to 200 μm. When the distance is 5 μm or more, a reduction in the nature of TCR can be suppressed, even in the case of containing a small amount of metallic carbon nanotubes, for example. In addition, the distance of 500 μm or less is advantageous when the infrared sensor is applied to an image sensor by two-dimensionally arraying the infrared sensors.

Any method may be used for producing the electrodes, without limitation, and the electrodes may be formed, for example, by vapor deposition, sputtering, a printing method, or a pressing method. In this case, a desired shape may be formed by using a photomask, a metal mask, or the like. A preformed metal thin film, alloy film, or the like may be used.

(Bolometer Film)

In the bolometer of the present embodiment, a carbon nanotube film containing carbon nanotubes is used as the bolometer film.

The carbon nanotube film (CNT film) as a bolometer film is a thin film composed of a plurality of carbon nanotubes forming conductive paths which electrically connect the two electrodes. Carbon nanotubes for example, preferably have a network-like structure, and preferably form a three-dimensional network structure because aggregation is less likely to occur and uniform conductive paths can be obtained.

At least some of the carbon nanotubes in the network of the carbon nanotubes may be oriented.

As the carbon nanotubes, single-walled, double-walled, and multi-walled carbon nanotubes may be used, but when semiconducting carbon nanotubes are separated, single-walled or few-walled (for example, double-walled or triple-walled) carbon nanotubes are preferred, and single-walled carbon nanotubes are more preferred. The carbon nanotubes preferably comprise single-walled carbon nanotubes in an amount of 80% by mass or more, and more preferably 90% by mass or more (including 100% by mass).

The carbon nanotubes, which are each a p-type semiconductor in their natural states, may be each transformed into an n-type semiconductor for use as described above. Methods used in the art for transforming a p-type semiconductor into an n-type semiconductor can be used without limitation, and examples thereof include a method of heating in vacuum, which is described in V. Derycke et al., Nano Letters, 1, 453 (2001), and a method with chemical doping, which is described in D. Suzuki et al., ACS Appl. Nano Mater, 1, 2469 (2018).

Semiconducting carbon nanotubes that have large band gaps and high carrier mobility and function as a p-type semiconductor or an n-type semiconductor are used for the bolometer film. The content of semiconducting carbon nanotubes, preferably of semiconducting monolayer carbon nanotubes is typically 67% by mass or more, preferably 70% by mass or more, and more preferably 80% by mass or more to the total amount of the carbon nanotubes. In particular, semiconducting carbon nanotubes are preferably contained in a proportion of 90% by mass or more, more preferably of 95% by mass or more, even more preferably of 99% by mass or more (including 100% by mass) to the total amount of the carbon nanotubes.

The diameter of the carbon nanotubes is preferably between 0.6 and 1.5 nm, more preferably 0.6 nm to 1.4 nm, and further preferably 0.7 to 1.2 nm, from the viewpoint of increasing the band gap to improve TCR. In one embodiment, the diameter of 1 nm or less may be particularly preferred in some cases. When the diameter is 0.6 nm or more, the manufacture of carbon nanotubes becomes much easier. When the diameter is 1.5 nm or less, the band gap is easily maintained in an appropriate range and a high TCR can be obtained.

As used herein, the diameter of the carbon nanotubes means that when the carbon nanotubes film is observed using an atomic force microscope (AFM) and the diameter thereof is measured at about 100 positions, 60% or more, preferably 70% or more, optionally preferably 80% or more, more preferably 100% thereof is within a range of 0.6 to 1.5 nm. It is preferred that 60% or more, preferably 70% or more, optionally preferably 80% or more, and more preferably 100% thereof be within a range of 0.6 to 1.4 nm, and further preferably within a range of 0.7 to 1.2 nm. In an embodiment, 60% or more, preferably 70% or more, optionally preferably 80% or more, and more preferably 100% thereof is within a range of 0.6 to 1 nm.

The length of the carbon nanotubes is preferably between 100 nm to 5 μm because dispersion is easy and application properties are excellent. Also, from the viewpoint of conductivity of the carbon nanotubes, the length is preferably 100 nm or more. When the length is 5 μm or less, aggregation upon forming a film is easily suppressed. The length of the carbon nanotubes is more preferably 300 nm to 3 μm, and further preferably 500 nm to 1.5 μm.

As used herein, the length of the carbon nanotubes means that, when at least 100 carbon nanotubes are observed using an atomic force microscope (AFM) and enumerated to measure the distribution of the length of the carbon nanotubes, 60% or more, preferably 70% or more, optionally preferably 80% or more, and more preferably 100% thereof is within a range of 100 nm to 5 μm. It is preferred that 60% or more, preferably 70% or more, optionally preferably 80% or more, and more preferably 100% thereof be within a range of 300 nm to 3 μm, and it is more preferred that 60% or more, preferably 70% or more, optionally preferably 80% or more, and more preferably 100% thereof be within a range of 500 nm to 1.5 μm.

When the diameter and length of the carbon nanotubes are within the above range, the influence of semiconductive properties becomes large and a large current value can also be obtained, and thus, a high TCR value is likely to be obtained when the carbon nanotubes are used as a bolometer film.

In the case of a mode in which the two electrodes provided on the substrate are connected via the carbon nanotube film positioned therebetween as shown by each illustration of FIGS. 2A to 2F, FIG. 3, and FIGS. 4G to 4P, if the carbon nanotubes are excessively long, the carbon nanotube film is formed in such a manner that the carbon nanotube film rides over the two electrodes, which may result in insufficient contact with the electrode walls of the two electrodes, in particular, contact failure with the electrode walls in basal regions of the electrodes; if the length of each carbon nanotube is within the above range, on the other hand, improved adhesion is provided between carbon nanotubes in the carbon nanotube film and the electrode walls.

The thickness of the bolometer film is not limited, in the range of, for example, 1 nm or more, for example a few nm to 10 μm, preferably 10 nm to 10 μm, more preferably 15 nm to 1 μm, further preferably 20 nm to 500 nm, particularly preferably 20 nm to 200 nm or more.

When the thickness of the bolometer film is 1 nm or more, a good light absorption rate can be achieved.

When the thickness of the carbon nanotube film is 10 nm or more, preferably 20 nm or more, the element structure can be made simpler because an adequate light absorption rate is obtained even without comprising a light reflection layer or a light absorbing material layer.

In addition, from the view point of simplifying the manufacturing method, it is preferred that the thickness of the bolometer film is 1 μm or less, preferably 500 nm or less. Also, when the bolometer film is too thick, the contact electrode formed by vapor deposition or the like from above may not fully contact the carbon nanotubes at the bottom side of the bolometer film, and the effective resistance value becomes higher, but when the thickness is within the above range, increase of the resistance value can be suppressed.

Also, when the thickness of the bolometer film is in the range of 10 nm to 1 m as described above, it is also preferable that printing techniques can be suitably applied to the manufacturing method of the bolometer film.

Also, in the case of comprising a light reflection layer or a light absorbing material layer, it is also possible to make the bolometer film thinner than the above range in order to further simplify the manufacturing process and improve the resistance value.

The thickness of the bolometer film can be determined as an average value of the thickness of the carbon nanotube film measured at arbitrary 10 positions.

The density of the bolometer film is, for example, 0.3 g/cm$^3$ or more, preferably 0.8 g/cm$^3$ or more, more preferably 1.1 g/cm$^3$ or more. The upper limit thereof is not particularly limited, but can be the upper limit of the true density of the carbon nanotube used (for example, about 1.4 g/cm$^3$).

When the density of the bolometer film is 0.3 g/cm$^3$ or more, a good light absorbing rate can be achieved.

When the density of the bolometer film is 0.5 g/cm$^3$ or more, it is preferred that the element structure can be simplified because an adequate light absorption rate is obtained even without comprising a light reflection layer or a light absorbing layer.

Also, when a light reflection layer or a light absorbing material layer is comprised, the density of the bolometer film of lower than the above-described density may be appropriately employed.

The density of the bolometer film can be calculated from weight, area, and the thickness obtained as above of the bolometer film.

In addition to the above-mentioned components described above, ionic conductors (surfactants, ammonium salts, inorganic salts), resins, organic binding agents, and the like may also be appropriately used in the bolometer film.

The content of carbon nanotubes in the bolometer film can be selected appropriately, and preferably more than 0.10% by mass or more based on the total mass of the bolometer film is effective, more preferably 1% by mass or more is effective, for example 30% by mass, and even 50% by mass or more may be preferred, and in some cases 60% by mass or more may be preferred.

An example of a method for manufacturing a carbon nanotube film used as a bolometer film is described in detail below.

From the carbon nanotubes, surface functional groups and impurities such as amorphous carbon, catalysts, and the like may be removed by performing a heat treatment under an inert atmosphere, in a vacuum. The heat treatment temperature may be appropriately selected and is preferably 800 to 2000° C., and more preferably 800 to 1200° C.

The carbon nanotube film can be produced with a carbon nanotube dispersion containing carbon nanotubes and a surfactant.

The surfactant is preferably a nonionic surfactant from the viewpoint of easy removal.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \quad (1)$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. In addition, N, N-bis[3-(D-gluconamido)propyl]deoxycholamide, n-dodecyl-β-D-maltoside, octyl-β-D-glucopyranoside, and digitonin may also be used.

As the nonionic surfactant, polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), octylphenol ethoxylate (molecular formula: $C_{14}H_{22}O$ $(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}$  $(CH_2CH_2O)_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) and the like may be used.

Use of a nonionic surfactant improves the dispersibility of the carbon nanotubes.

If large amounts of impurities such as a surfactant remain in the carbon nanotube film, satisfactory junctions are not formed between the electrodes and carbon nanotubes in some cases. However, nonionic surfactants can be easily removed with the thermal treatment described later or the like, leaving reduced residues thereof in the carbon nanotube film, which leads to improved contact between the electrodes and the carbon nanotube film. In the case that a lower-work-function metal is used for the first layer of an electrode as described above, for example, a large amount of residues of a surfactant in the carbon nanotube film may cause insufficient contact between the metal in the first layer and the carbon nanotube film, resulting in failure in forming Schottky junctions; in the present embodiment, on the other hand, surfactants can be removed with ease, which allows Schottky junctions to be formed even when a lower-work-function metal is used for the first layer of an electrode.

Accordingly, for a bolometer according to an embodiment, it is preferable to remove a surfactant in the bolometer film to reduce the amount of the residual surfactant, and it is preferable in an embodiment that the bolometer film contain substantially no surfactant. The statement that the bolometer film contains substantially no surfactant means that the concentration of a residual surfactant is preferably 0.01% by mass or less, and more preferably 0.001% by mass or less (including 0% by mass) to the total mass of the bolometer film.

The method for obtaining a dispersion liquid of carbon nanotubes is not particularly limited, and conventionally known methods can be applied. For example, a carbon nanotube mixture, a dispersion medium, and a nonionic surfactant are mixed to prepare a solution containing carbon nanotubes, and this solution is subjected to sonication to disperse the carbon nanotubes, thereby preparing a carbon nanotube dispersion liquid (micelle dispersion solution). The dispersion medium is not particularly limited, as long as it is a solvent that allows carbon nanotubes to disperse and suspend during the separation step, and for example, water, heavy water, an organic solvent, an ionic liquid, or a mixture thereof may be used, and water and heavy water are preferred. In addition to or instead of the sonication mentioned above, a technique of dispersing carbon nanotubes by a mechanical shear force may be used. The mechanical shearing may be performed in a gas phase. In a micelle dispersion aqueous solution of the carbon nanotubes and the nonionic surfactant, the carbon nanotubes are preferably in an isolated state. Thus, if necessary, bundles, amorphous carbon, impurity catalysts, and the like may be removed using an ultracentrifugation treatment. During the dispersion treatment, the carbon nanotubes can be cut, and the length thereof can be controlled by changing the grinding conditions of the carbon nanotubes, ultrasonic output, ultrasonic treatment time, and the like. For example, the aggregate size can be controlled by grinding the untreated carbon nanotubes using tweezers, a ball mill, or the like. After these treatments, the length can be controlled to 100 nm to 5 μm using an ultrasonic homogenizer by setting the output to 40 to 600 W, optionally 100 to 550 W, 20 to 100 KHz, the treatment time to 1 to 5 hours, preferably up to 3 hours. When the treatment time is shorter than 1 hour, the carbon nanotubes may be hardly dispersible depending on the conditions, and may remain almost the original length in some cases. From the viewpoint of shortening the dispersion treatment time and reducing the cost, the treatment time is preferably 3 hours or less. The present embodiment may also have the advantage of ease of adjustment of cutting due to use of a nonionic surfactant. In addition, it has the advantage of containing no ionic surfactant which is difficult to be removed.

Dispersion and cutting of the carbon nanotubes generate a surface functional group at the surface or the end of the carbon nanotube. Functional groups such as carboxyl group, carbonyl group, and hydroxyl group are generated. When the treatment is performed in a liquid phase, a carboxyl group and a hydroxyl group are generated, and when the treatment is performed in a gas phase, a carbonyl group is generated.

The concentration of the surfactant in the liquid comprising heavy water or water and a nonionic surfactant mentioned above is preferably from the critical micelle concentration to 10% by mass, and more preferably from the critical micelle concentration to 3% by mass. The concentration less than the critical micelle concentration is not preferred because dispersion is impossible. When the concentration is 10% by mass or less, a sufficient density of carbon nanotubes can be applied after separation, while reducing the amount of surfactant. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The concentration of the carbon nanotubes in the above cutting and dispersion step (the weight of the carbon nanotubes/(the total weight of the carbon nanotubes, the dispersion medium and the surfactant)×100) is not particularly limited, and for example, may be 0.0003 to 10% by mass, preferably 0.001 to 3% by mass, and more preferably 0.003 to 0.3% by mass.

The dispersion liquid obtained through the aforementioned cutting and dispersion step may be used as it is in the separation step mentioned below, or steps such as concentration and dilution may be performed before the separation step.

The carbon nanotubes are a mixture of semiconducting carbon nanotubes and metallic carbon nanotubes in typical cases. In the present embodiment, it is preferable to separate or concentrate semiconducting carbon nanotubes that function as a p-type semiconductor or an n-type semiconductor for use.

Separation of the semiconducting carbon nanotubes and the metallic carbon nanotubes can be performed by, for example, the electric-field-induced layer formation method (ELF method: see, for example, K. Ihara et al. J. Phys. Chem. C. 2011, 115, 22827 to 22832 and Japanese Patent No. 5717233, which are incorporated herein by reference). One example of the separation method using the ELF method will be described. Carbon nanotubes, preferably single-walled carbon nanotubes are dispersed by a nonionic surfactant, and the dispersion liquid is put into a vertical separation apparatus, and then a voltage is applied to the electrodes arranged above and below, so that the carbon nanotubes are separated by free flow electrophoresis. The mechanism of separation can be inferred as follows for example. When the carbon nanotubes are dispersed by the nonionic surfactant, the micelle of the semiconducting carbon nanotubes has a negative zeta potential, whereas the micelle of the metallic carbon nanotubes has an opposite (positive) zeta potential (in recent years, it is considered that the metallic carbon nanotubes have a slightly negative zeta potential or are barely charged). Thus, when an electric field is applied to the carbon nanotube dispersion liquid, the micelle of the semiconducting carbon nanotubes is electrophoresed toward the anode (+) direction, and the micelle of the metallic carbon nanotubes is electrophoresed toward the cathode (−) direction by the difference between the zeta potentials, and the like. Eventually, the layer in which the semiconducting carbon nanotubes are concentrated is formed near the anode, and the layer in which the metallic carbon nanotubes are concentrated is formed near the cathode in the separation tank. The voltage for separation may be appropriately set in consideration of the composition of the dispersion medium, the charge amount of carbon nanotubes, and the like, and is preferably 1 V or more and 200 V or less, and more preferably 10 V or more and 200 V or less. It is preferably 100 V or more from the viewpoint of shortening the time for the separation step. It is preferably 200 V or less from the viewpoint of suppressing the generation of bubbles during separation and maintaining the separation efficiency. The purity is improved by repeating separation. The same separation procedure may be performed by resetting the dispersion liquid after separation to the initial concentration. As a result, the purity can be further increased.

Through the aforementioned dispersion and cutting step and separation step of the carbon nanotubes, a dispersion liquid in which the semiconducting carbon nanotubes having the desired diameter and length are concentrated can be obtained. As used herein, the carbon nanotube dispersion liquid in which semiconducting carbon nanotubes are concentrated may be referred to as the "semiconducting carbon nanotube dispersion liquid". The semiconducting carbon nanotube dispersion liquid obtained by the separation step comprises semiconducting carbon nanotubes generally 67% by mass or more, preferably 70% by mass or more, more preferably 80% by mass or more in the total amount of carbon nanotubes, and it is particularly preferably 90% by mass or more, more preferably 95% by mass or more, further preferably 99% by mass or more (the upper limit may be 100% by mass). The separation tendency of the metallic and semiconducting carbon nanotubes can be analyzed by microscopic Raman spectroscopy and ultraviolet-visible near-infrared absorptiometry.

The centrifugation treatment may be performed to remove the bundles, amorphous carbon, metal impurities, and the like in the carbon nanotube dispersion liquid after the aforementioned dispersion and cutting step of the carbon nanotubes and before the separation step. The centrifugal acceleration may be appropriately adjusted, and is preferably 10000×g to 500000×g, more preferably 50000×g to 300000×g, and optionally 100000×g to 300000×g. The centrifugation time is preferably 0.5 hours to 12 hours, and more preferably 1 to 3 hours. The centrifugation temperature may be appropriately adjusted, and is preferably 4° C. to room temperature, and more preferably 10° C. to room temperature.

The concentration of the surfactant in the carbon nanotube dispersion liquid after separation which is used for the application may be appropriately controlled. The concentration of the surfactant in the carbon nanotube dispersion liquid is preferably from the critical micelle concentration to about 5% by mass, more preferably, 0.001% by mass to 3% by mass, and particularly preferably 0.01 to 1% by mass to suppress the reaggregation after application and the like.

The semiconducting carbon nanotube dispersion liquid obtained by the process described above can be applied on a predetermined base material, dried, and, optionally heat treated to form a bolometer film.

The method for applying the semiconducting carbon nanotube dispersion liquid to a predetermined base material is not particularly limited, and examples thereof include dropping method, spin coating, printing, inkjet, spray coating, dip coating, and the like. From the viewpoint of reducing the manufacturing cost, a printing method is preferred. The printing methods can include application (dispenser, inkjet or the like), transferring (microcontact print, gravure printing, or the like) and the like.

The semiconducting carbon nanotubes dispersion liquid applied on a desired base material may be subjected to a heat treatment to remove the surfactant and the solvent. The temperature of the heat treatment may be appropriately set as long as it is equal to or higher than the decomposition temperature of the surfactant, and it is preferably 150 to 500° C., and more preferably 160 to 500° C., for example 180 to 400° C. A temperature of 180° C. or more is preferred because the remaining of the decomposition product of the surfactant can be easily suppressed. A temperature of 500° C. or less, for example 400° C. or less is preferred because the change in the quality of the substrate or other components can be suppressed. Also, the decomposition of carbon nanotubes, the change in size, the leaving of functional groups, and the like can be suppressed.

(Substrate)

The substrate may be either a flexible substrate or a rigid substrate, and may be appropriately selected, and those in which at least the element forming surface has insulating property or semiconducting property are preferred. For examples, inorganic materials such as Si, $SiO_2$-coated Si, $SiO_2$, SiN, glass and the like, and organic materials such as polymers, resins, plastics, for examples, parylene, polyimide, polyethylene, polypropylene, polystyrene, polyvinyl chloride, polyethylene terephthalate, acrylonitrile styrene resin, acrylonitrile butadiene styrene resin, fluororesin, methacrylic resin, polycarbonate and the like, but is not limited thereto.

The surface of the substrate may be treated with a material to enhance the adhesion of the carbon nanotubes, such as APTES (3-aminopropyltriethoxysilane).

As used herein, the term "substrate" means any base material on which a bolometer film and the electrode of the present embodiment are formed, where the base material supports the bolometer film and the electrode. The "substrate" is not limited to a base material in a flat plate form such as a glass plate or a silicon wafer, and may have a structured body or a multilayer structure. Therefore, the bolometer of the present embodiment is not limited to the form shown in FIG. 1, but is also applicable to a bolometer having a diaphragm structure, or a bolometer having any layer such as a heat insulation layer under the bolometer film. For example, in the case of a bolometer having a diaphragm structure, a diaphragm with a gap as a heat insulation structure is provided, and the bolometer film and the electrode of the present embodiment are provided thereon, in which case the entire base material including the diaphragm can be considered as the "substrate". In the case of a bolometer having a heat insulation layer under the bolometer film, the heat insulation layer and any other layers that may be formed thereon as necessary may be considered as the "substrate," on which the bolometer film and the electrode of the present embodiment will be provided.

(Other Components)

In addition to the above, the bolometer of the present embodiment may comprise any other components used for bolometers.

For example, a protective film may be provided on the surface of the bolometer film, if necessary. The protective film is preferably a material with high transparency in the wavelength range of the light to be detected. Examples of the protective film include acrylic resins such as PMMA and PMMA anisole, epoxy resins, Teflon®, silicon nitride, silicon oxide ($SiO_2$), and the like.

A light-absorbing layer may also be provided on the upper side of the bolometer film (the side to which light is incident), as necessary. Examples of the light-absorbing layer to be provided above the protective layer include a thin film of titanium nitride, and the like, and examples of the light-absorbing layer to be provided above the bolometer film include a coating film of polyimide, and the like, but not limited thereto.

[Method for Producing Bolometer]

The bolometer of the present embodiment can be produced, for example, in the following manner. Two electrodes (the first electrode 2 and the second electrode 4) are formed on the substrate 1, for example, by vapor deposition, a sputtering method, or application. A dispersion containing semiconducting carbon nanotubes is applied onto the substrate 1 including the two electrodes formed thereon, and dried to form the bolometer film 3 lying between the two electrodes to connect the two electrodes. As necessary, impurities such as an excessive portion of a solvent and a surfactant are removed through thermal treatment or the like.

Alternatively, the bolometer of the present embodiment can be produced in the following manner. Si coated with $SiO_2$ is prepared for use as the substrate 1, washed with acetone, isopropyl alcohol, and water in order, and then subjected to oxygen plasma treatment to remove organic matters and others on the surface. Next, the substrate is soaked in an aqueous solution of 3-aminopropyltriethoxysilane (APTES), and dried. A dispersion containing semiconducting carbon nanotubes dispersed in a solution of polyoxyethylene alkyl ether, which is a nonionic surfactant, such as polyoxyethylene (100) stearyl ether is prepared, applied onto the substrate, and dried. The nonionic surfactant and others are removed through firing at 180° C. or higher in the atmosphere. As a result of these operations, the bolometer film 3 is formed on the substrate. Thereafter, the two electrodes of the present embodiment (the first electrode 2, the second electrode 4) are produced, for example by vapor deposition, a sputtering method, or application in such a manner that the electrodes stack on the bolometer film 3. Onto a region between the electrodes on the bolometer film layer formed, an acrylic resin (PMMA) solution is applied to form a PMMA protective layer. Thereafter, the whole of the substrate is subjected to oxygen plasma treatment to remove excessive carbon nanotubes and others present in regions other than the bolometer film layer. Impurities such as an excessive portion of a solvent and a surfactant are removed by heating at 200° C. or higher in the atmosphere.

The obtained bolometer of FIG. 1 detects temperature using the temperature dependence of electrical resistance due to light irradiation. Therefore, it can be used to detect it similarly in frequency regions other than the infrared light as well as long as the temperature changes due to light irradiation. The bolometer of the present embodiment using a bolometer film comprising carbon nanotubes can be particularly preferably used for detecting an electromagnetic wave having a wavelength of 0.7 µm to 1 mm. The electromagnetic waves included in this wavelength range include, in addition to infrared ray, terahertz wave. The bolometer of the present embodiment is preferably a bolometer-type infrared detector.

In addition, the detection of the change in electrical resistance caused by temperature change can also be performed not only by the structure of FIG. 1, but also by providing a gate electrode to form a field effect transistor and thereby amplifying the change in resistance value.

In addition to the structure shown in FIG. 1, the bolometer of the present embodiment can be applied without any particular restrictions to element structures typically used for bolometers, such as an element with a diaphragm structure, an element with a desired heat insulation structure such as a heat insulating layer formed by a heat insulating resin, instead of a diaphragm structure, and the like.

Although the basic configuration of the bolometer of the present embodiment has been shown hereinbefore, an element structure and array structure applicable to infrared detectors can be applied to the bolometer of the present embodiment, without limitation. For example, the bolometer of the present embodiment may be a single element or may be an array in which a plurality of elements is two-dimensionally arranged such as those used in an image sensor.

The whole or part of the example embodiments disclosed above can be described as, but not limited to, the following supplementary notes.

(Supplementary Note 1)

A bolometer comprising two electrodes and a bolometer film lying between the two electrodes to connect the two electrodes,
  wherein the bolometer film comprises semiconducting carbon nanotubes in a proportion of 90% by mass or more to the total amount of carbon nanotubes and comprises p-type semiconducting carbon nanotubes, and
  one or both of the two electrodes comprise(s) a monometal or alloy having lower work function than the p-type semiconducting carbon nanotubes at least in a part of the electrode.

(Supplementary Note 2)

A bolometer comprising two electrodes and a bolometer film lying between the two electrodes to connect the two electrodes,
  wherein the bolometer film comprises n-type semiconducting carbon nanotubes, and
  one or both of the two electrodes comprise(s) a monometal or alloy having higher work function than the n-type semiconducting carbon nanotubes at least in a part of the electrode.

(Supplementary Note 3)

The bolometer according to supplementary note 1, wherein the monometal or alloy having lower work function than the p-type semiconducting carbon nanotubes comprises at least one selected from the group consisting of titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

(Supplementary Note 4)

The bolometer according to supplementary note 2, wherein the monometal or alloy having higher work function than the n-type semiconducting carbon nanotubes comprises at least one selected from the group consisting of gold, platinum, copper, cobalt, nickel, carbon, and palladium.

(Supplementary Note 5)

The bolometer according to supplementary note 2, wherein the bolometer film comprises semiconducting carbon nanotubes in a proportion of 90% by mass or more to the total amount of carbon nanotubes.

(Supplementary Note 6)

The bolometer according to any one of supplementary notes 1 to 5, wherein the carbon nanotubes and at least one of the two electrodes are jointed via Schottky junctions in at least some parts, and thereby current-voltage characteristics of Schottky junctions are exhibited.

(Supplementary Note 7)

The bolometer according to any one of supplementary notes 1 to 6, wherein the two electrodes are identical.

(Supplementary Note 8)

The bolometer according to any one of supplementary notes 1 to 7, wherein at least one of the two electrodes is composed of two or more metals.

(Supplementary Note 9)

The bolometer according to supplementary note 1,
  wherein at least one of the two electrodes comprises the monometal or alloy having lower work function than the p-type semiconducting carbon nanotubes in a proportion of 10% by mass or less of the total amount of metals in parts where the bolometer film contacts, or
  wherein the contact area between the monometal or alloy having lower work function than the p-type semiconducting carbon nanotubes and the bolometer film is 10% or less to the total contact area between the electrode and the bolometer film.

(Supplementary Note 10)

The bolometer according to supplementary note 2,
  wherein at least one of the two electrodes comprises the monometal or alloy having higher work function than the n-type semiconducting carbon nanotubes in a proportion of 10% by mass or less of the total amount of metals in parts in contact with the bolometer film, or
  wherein the contact area between the monometal or alloy having higher work function than the n-type semiconducting carbon nanotubes and the bolometer film is 10% or less to the total contact area between the electrode and the bolometer film.

(Supplementary Note 11)

The bolometer according to any one of supplementary notes 1 to 10, wherein at least one of the two electrodes is composed of an alloy of two or more metals.

(Supplementary Note 12)

The bolometer according to any one of supplementary notes 1 to 11, wherein the two electrodes are provided in such a manner that the two electrodes are in contact with a substrate.

(Supplementary Note 13)

The bolometer according to any one of supplementary notes 1 to 12, wherein the length of each of the carbon nanotubes is within the range of 100 nm to 5 µm.

(Supplementary Note 14)

A method for producing a bolometer comprising two electrodes and a bolometer film lying between the two electrodes to connect the two electrodes, the method comprising:
  producing a bolometer film comprising semiconducting carbon nanotubes in a proportion of 90% by mass or more to the total amount of carbon nanotubes and comprising p-type semiconducting carbon nanotubes; and producing two electrodes, before or after producing the bolometer film, in such a manner that the two electrodes connect to the bolometer film, wherein one or both of the two electrodes comprise(s) a monometal or alloy having lower work function than the p-type semiconducting carbon nanotubes at least in a part of the electrode.

(Supplementary Note 15)

A method for producing a bolometer comprising two electrodes and a bolometer film lying between the two electrodes to connect the two electrodes, the method comprising:

converting carbon nanotubes each into an n-type semiconductor;

producing a bolometer film comprising n-type semiconducting carbon nanotubes; and producing two electrodes, before or after producing the bolometer film, in such a manner that the two electrodes connect to the bolometer film, wherein one or both of the two electrodes comprise(s) a monometal or alloy having higher work function than the n-type semiconducting carbon nanotubes at least in a part of the electrode.

(Supplementary Note 16)

The method for producing a bolometer according to supplementary note 14 or 15, the method comprising:

subjecting a dispersion comprising carbon nanotubes and a surfactant to carrier-free electrophoresis to prepare a carbon nanotube dispersion comprising semiconducting carbon nanotubes and a surfactant;

producing a bolometer film with the carbon nanotube dispersion comprising the semiconducting carbon nanotubes and the surfactant; and removing the surfactant from the bolometer film formed.

(Supplementary Note 17)

The method for producing a bolometer according to any one of supplementary notes 14 to 16, wherein the surfactant is a nonionic surfactant.

(Supplementary Note 18)

The method for producing a bolometer according to supplementary note 16 or 17, wherein the step of removing the surfactant from the bolometer film formed comprises a step of firing at 160° C. or higher in the atmosphere.

(Supplementary Note 19)

The method for producing a bolometer according to supplementary note 15, the method comprising:

converting carbon nanotubes each being a p-type semiconductor into n-type semiconducting carbon nanotubes.

EXAMPLES

Example 1

100 mg of single-walled carbon nanotubes (Meijo Nano Carbon Co., Ltd., EC 1.0 (diameter: about 1.1 to 1.5 nm (average diameter 1.2 nm)) was put in a quartz boat and heat treatment was performed under a vacuum atmosphere using an electric furnace. The heat treatment was performed at a temperature of 900° C. for 2 hours. The weight after heat treatment was reduced to 80 mg, and it was found that the surface functional groups and impurities were removed. After the obtained single-walled carbon nanotubes were fractured with tweezers, 12 mg of which was immersed in 40 ml of an aqueous solution of 1 wt % surfactant (polyoxyethylene (100) stearyl ether) and after sufficient sedimentation, the mixture was subjected to ultrasonic dispersion treatment (BRANSON ADVANCED-DIGITAL SONIFIER apparatus, output: 50 W) for 3 hours. Through this step, aggregates of the carbon nanotubes in the solution were eliminated. Through this procedure, bundles, remaining catalysts, and the like were removed to obtain a carbon nanotube dispersion liquid. The dispersion liquid was applied on a $SiO_2$ substrate and dried at 100° C., which was then observed by an atomic force microscope (AFM) to observe the length and the diameter of carbon nanotubes. As a result, it was found that at least 70% of the single-walled carbon nanotubes had a length within a range of 500 nm to 1.5 μm and the average length thereof was approximately 800 nm.

The above obtained carbon nanotube dispersion liquid was introduced into the separation apparatus having a double tube structure. About 15 ml of water, about 70 ml of the carbon nanotube dispersion liquid, and about 10 ml of 2 wt % aqueous surfactant solution were put into the outer tube of the double tube, and about 20 ml of 2 wt % aqueous surfactant solution was also put into the inner tube. Thereafter, the bottom lid of the inner tube was opened, resulting in a three-layer structure having different surfactant concentrations. A voltage of 200 V was applied with the bottom side of the inner tube being anode, and the upper side of the outer tube being cathode, and semiconducting carbon nanotubes were transferred towards the anode side. On the other hand, metallic carbon nanotubes were transferred towards the cathode side. After 80 hours from the start of separation, semiconducting carbon nanotubes and metallic carbon nanotubes were separated cleanly. The separation step was carried out at room temperature (about 25° C.). The semiconducting carbon nanotube dispersion liquid transferred to the anode side was collected and analysed using the light absorption spectrum, and it was found that the metallic carbon nanotubes components were removed. It was also found from the Raman spectrum that 99 wt % of the carbon nanotubes in the carbon nanotube dispersion liquid transferred to the anode side were semiconducting carbon nanotubes. The most frequent diameter of the single-walled carbon nanotubes was about 1.2 nm (70% or more), and the average diameter was 1.2 nm.

The surfactant was partially removed from the carbon nanotube dispersion liquid comprising 99 wt % semiconducting carbon nanotubes as described above (the carbon nanotube dispersion liquid transferred to the anode side) to adjust the concentration of the surfactant to be 0.05 wt %. Thereafter, the carbon nanotube dispersion liquid was adjusted into a carbon nanotube dispersion liquid A having a carbon nanotube concentration in the dispersion liquid of 0.01 wt % (referred to as dispersion liquid A). This dispersion liquid A was used to form a carbon nanotube layer.

An Si substrate with $SiO_2$ formed on the surface was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 200 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2A).

Comparative Example 1

Carbon nanotube dispersion A was prepared in the same manner as in the process of Example 1. An Si substrate which is the same as that in Example 1 was washed with acetone, isopropyl alcohol, and water in order, and organic matters on the surface were removed through oxygen plasma treatment. The substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

Au of 200 nm in thickness was formed on the carbon nanotube film through vapor deposition to produce a first electrode and a second electrode in such a manner that an interval of 100 μm was provided between the electrodes.

Example 2

Carbon nanotube dispersion A was prepared in the same manner as in the process of Example 1. Electrodes were produced on an Si substrate which is the same as that in Example 1 through E-gun vapor deposition with a metal mask. The first electrode and the second electrode were formed both as Ti of 5 nm in thickness and Au of 100 nm in thickness through vapor deposition in such a manner that an interval of 100 μm was provided between the electrodes. This substrate with the electrodes was washed with acetone, isopropyl alcohol, and water in order, and organic matters on the surface were removed through oxygen plasma treatment. The substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 200° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2A).

Example 3

Carbon nanotube dispersion A was prepared in the same manner as in the process of Example 1. In the same manner as in Example 1, a first electrode and a second electrode were formed both as Ti of 10 nm in thickness and Pt of 200 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2A).

Example 4

Carbon nanotube dispersion A was prepared in the same manner as in the process of Example 1. An Si substrate which is the same as that in Example 1 was washed with acetone, isopropyl alcohol, and water in order, and organic matters on the surface were removed through oxygen plasma treatment. The substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

A mixture of Ag and Pt (mass ratio: 1:2), the mixture being of 200 nm in thickness, was formed on the carbon nanotube film through vapor deposition to produce a first electrode and a second electrode in such a manner that an interval of 100 μm was provided between the electrodes (structure of electrodes: FIG. 4K).

Example 5

Carbon nanotube dispersion A was prepared in the same manner as in the process of Example 1. An Si substrate which is the same as that in Example 1 was washed with acetone, isopropyl alcohol, and water in order, and organic matters on the surface were removed through oxygen plasma treatment. The substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

A mixture of Ag and Au (mass ratio: 1:2), the mixture being of 200 nm in thickness, was formed on the carbon nanotube film through vapor deposition to produce a first electrode and a second electrode in such a manner that an interval of 100 µm was provided between the electrodes (structure of electrodes: FIG. 4K).

Example 6

Carbon nanotube dispersion A was prepared in the same manner as in the process of Example 1. In the same manner as in Example 1, a first electrode and a second electrode were formed both as Ti of 20 nm in thickness on the Si substrate through E-gun vapor deposition.

This substrate with the electrodes was washed with acetone, isopropyl alcohol, and water in order, and organic matters on the surface were removed through oxygen plasma treatment. The substrate was soaked in 0.5% by volume aqueous solution of APTES for 30 minutes, washed with water, and then dried.

Onto the APTES-coated substrate, approximately 100 µL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

Figure 3:
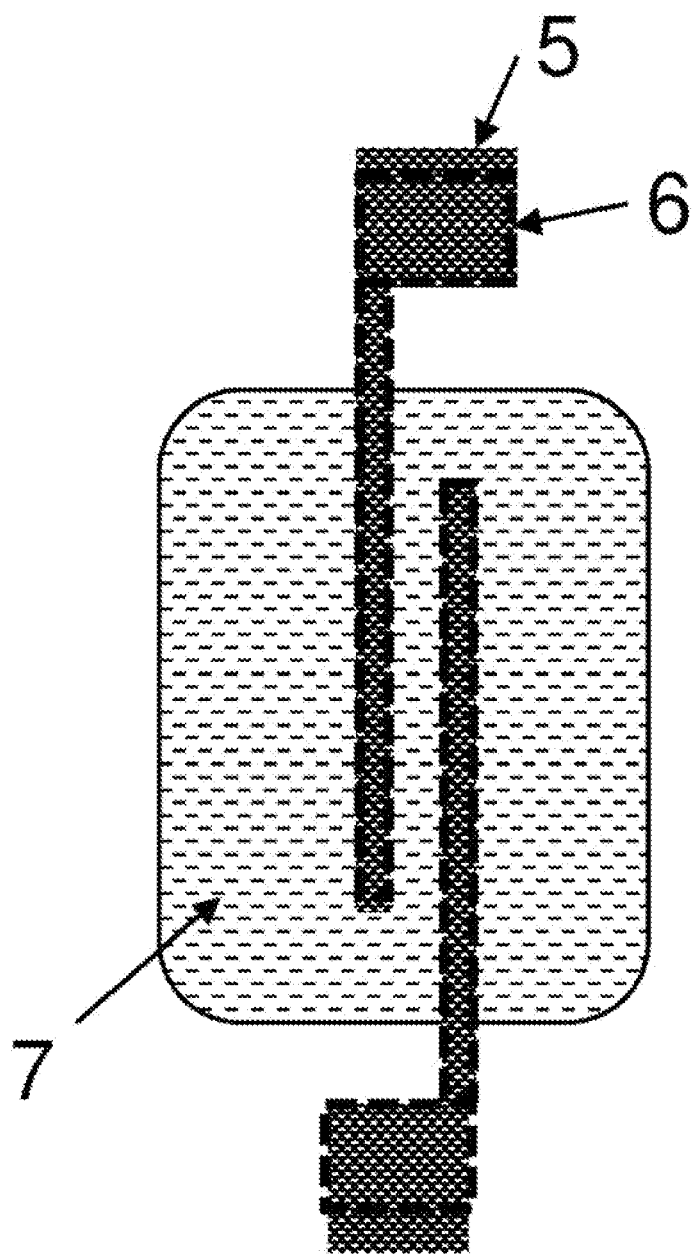
FIG. 3 is a schematic diagram (plan view) showing one example of an electrode structure of a bolometer of the present invention.

On the carbon nanotube film, Au of 200 nm in thickness was formed just above the Ti electrodes through vapor deposition to produce a third electrode and a fourth electrode in such a manner that an interval of 100 µm was provided between the electrodes. The structure was such that the first electrode and the third electrode were combined and the second electrode and the fourth electrode were combined at measurement electrode parts except contacts with carbon nanotubes (structure of electrodes: FIG. 2F, planar view: FIG. 3).

Example 7

Carbon nanotube dispersion A was prepared in the same manner as in the process of Example 1. In the same manner as in Example 1, a first electrode and a second electrode were formed both as Ti of 5 nm in thickness and Au of 100 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 µL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

On the carbon nanotube film, Au of 100 nm in thickness was formed just above the Ti—Au electrodes through vapor deposition to produce a third electrode and a fourth electrode in such a manner that an interval of 100 µm was provided between the electrodes. The structure was such that the first electrode and the third electrode were combined and the second electrode and the fourth electrode were combined at measurement electrode parts except contacts with carbon nanotubes (structure of electrodes: FIG. 4I, planar view: FIG. 3).

Example 8

Carbon nanotube dispersion A was prepared in the same manner as in the process of Example 1. In the same manner as in Example 1, a first electrode and a second electrode were formed both as Ti of 50 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 µL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 4L).

Example 9

Carbon nanotube dispersion A was prepared in the same manner as in Example 1. The Si substrate which is the same as in Example 1 was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 µL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

Ag of 200 nm in thickness was formed on the carbon nanotube film through vapor deposition to produce a first electrode and a second electrode in such a manner that an interval of 100 µm was provided between the electrodes (structure of electrodes: FIG. 4J).

Example 10

Carbon nanotube dispersion A was prepared in the same manner as in the process of Example 1. In the same manner as in Example 1, a first electrode and a second electrode were formed both as Ti of 50 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

On the carbon nanotube film, Ag of 100 nm in thickness was formed just above the Ti electrodes through vapor deposition to produce a third electrode and a fourth electrode in such a manner that an interval of 100 μm was provided between the electrodes. The structure was such that the first electrode and the third electrode were combined and the second electrode and the fourth electrode were combined at measurement electrode parts except contacts with carbon nanotubes (structure of electrodes: FIG. 4M, planar view: FIG. 3).

Example 11

Carbon nanotube dispersion A was prepared in the same manner as in the process of Example 1. In the same manner as in Example 1, a first electrode and a second electrode were formed with the thickness of 80 nm both as a Ti-6Al-4V alloy (90% by mass of Ti+6% by mass of Al+4% by mass of V) on the Si substrate with a multi-source sputtering apparatus.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 4O).

Example 12

Carbon nanotube dispersion A was prepared in the same manner as in Example 1. The Si substrate which is the same as in Example 1 was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

Au of 200 nm in thickness was formed on the carbon nanotube film through vapor deposition to produce a first electrode and a second electrode in such a manner that an interval of 100 μm was provided between the electrodes, wherein, in contrast to Comparative Example 1, vapor deposition was carried out under conditions that allowed the metal Al to mix as an impurity in a proportion of 0.2% by mass (structure of electrodes: FIG. 4G).

Example 13

Carbon nanotube dispersion A was prepared in the same manner as in the process of Example 1. In the same manner as in Example 1, a first electrode and a second electrode were formed both as Ti of 1 nm in thickness and Au of 100 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2A).

Example 14

Carbon nanotube dispersion A was prepared in the same manner as in the process of Example 1. In the same manner as in Example 1, a first electrode and a second electrode were formed both as Ti of 5 nm in thickness and Au of 100 nm in thickness on the Si substrate through E-gun vapor deposition.

This substrate with the electrodes was sequentially washed with acetone, isopropyl alcohol and water and subjected to oxygen plasma treatment to remove organic substances on a surface. The substrate was immersed in a 2% by volume APTES aqueous solution for 30 minutes and dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 4P).

Comparison Between Examples 1 to 14 and Comparative Example 1

Figure 5:
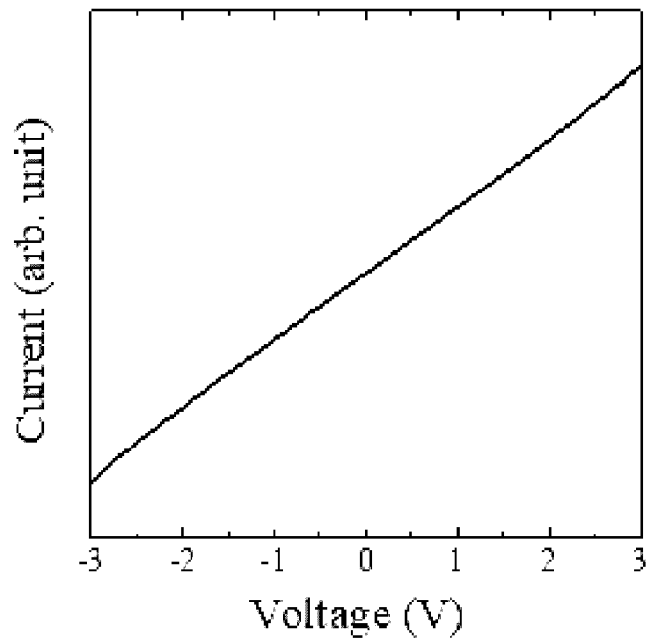
FIG. 5 is a graph showing IV characteristics for a comparative example in Examples.

FIG. 5 shows the current-voltage characteristics of a bolometer produced from the electrodes and the carbon nanotube film in Comparative Example 1 at 300 K, FIG. 6 shows those for Examples 1 to 7, FIG. 7 shows those for Examples 8 to 11, FIG. 8 shows those for Examples 12 and 13, and FIG. 9 shows those for Example 14. Comparative Example 1 gave linear current-voltage characteristics (FIG. 5), and Examples 1 to 7 gave Schottky-type current-voltage characteristics (FIG. 6). Examples 8 to 11 gave Schottky-type current-voltage characteristics such that high currents flowed at high voltages in both the positive and negative voltage regions (FIG. 7). Examples 12 to 14 gave current-voltage characteristics such that Schottky-type current-voltage characteristics were overlapping with linear current-voltage characteristics (FIG. 8, FIG. 9).

Table 1 shows results of measurement of film resistance values at a voltage of 3 V for Examples 1 to 14 and Comparative Example 1. Comparative Example 1 gave linear current-voltage characteristics because the monolayer carbon nanotubes each being a p-type semiconductor were in contact only with a metal having higher work function than the carbon nanotubes (Au), adhering in an ohmic manner, and the resistance was relatively high even at high voltages because of the ohmic adhesion. The configuration as in Examples 1 to 7, in which carbon nanotubes were in contact with both a metal having higher work function than the carbon nanotubes (Au or Pt) and a metal having lower work function than the carbon nanotubes (Ti or Ag), was found to give Schottky-type current-voltage characteristics, with the resistance being one to three orders of magnitude lower than that for Comparative Example 1. The configuration as in Examples 8 to 11, in which carbon nanotubes were in contact only with a metal having lower work function than the carbon nanotubes, was found to give Schottky-type current-voltage characteristics such that high currents flowed at high voltages in both the positive and negative voltage regions, with the resistance being one or more orders of magnitude lower than that for Comparative Example 1. The configuration as in Examples 12 to 14, in which carbon nanotubes were in contact with electrodes with a metal having lower work function than the carbon nanotubes (Al) mixing as an impurity, was found to give current-voltage curves such that Schottky-type current-voltage characteristics were overlapping with linear current-voltage characteristics. Those samples each exhibited a weak Schottky-type current-voltage component and hence the resistances were only slightly lower than that for Comparative Example 1; nevertheless, enhancement of the Schottky-type current-voltage component by increasing the amount of an impurity is likely to give reduced resistance at even higher voltages. The configuration as in Example 13, in which carbon nanotubes were in contact with a metal having lower work function than the carbon nanotubes (Ti) only at an impurity level, and the configuration as in Example 14, in which carbon nanotubes were in contact to a slight degree with a metal having lower work function than the carbon nanotube (Ti) because Ti regions as lower regions of the electrodes were almost but not completely covered with APTES, also gave current-voltage curves such that linear current-voltage characteristics and Schottky-type current-voltage characteristics were overlapping with each other.

Figure 10:
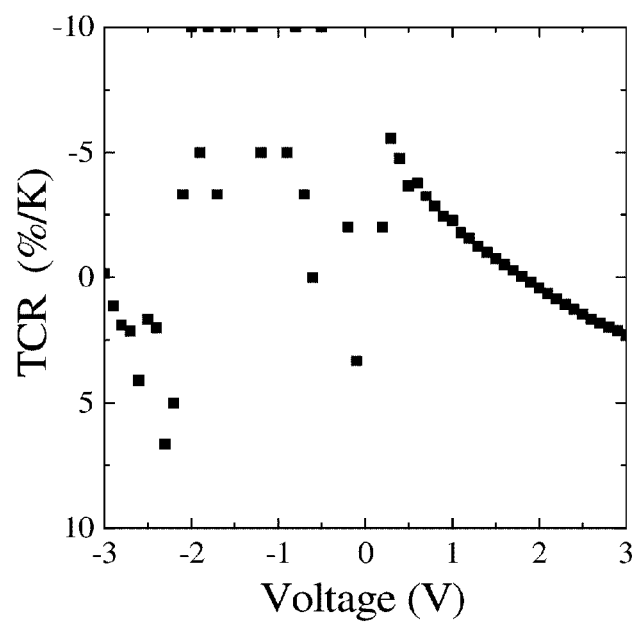
FIG. 10 is a graph showing TCR for an example in Examples.

Furthermore, particularly high TCR was exhibited in a broad voltage region for Examples 12 to 14. Table 2 shows results of measurement of average TCR within a voltage range of −3 V to +3 V at 25° C. to 35° C. for Examples 1 and 12 to 14, and Comparative Example 1. FIG. 10, FIG. 11, and FIG. 12 show TCR-voltage characteristics for Example 1, Example 12, and Example 14, respectively. For Example 1, transition from negative TCR to low positive TCR was exhibited as the voltage increased in the positive voltage region, and a large variation of TCR was found in a region from low positive voltages to negative voltages, with TCR as high as −5%/K or more exhibited only in a narrow voltage region. For the cases that a current-voltage curve such that Schottky-type current-voltage characteristics were overlapping with linear current-voltage characteristics as for Examples 12 to 14, on the other hand, slightly low TCR was exhibited in the positive voltage region highly influenced by Schottky-type characteristics; nevertheless, particularly high TCR was exhibited over a broad voltage region.

Thus, noise-reduced, low-resistance sensors provided with high sensitivity were successfully produced as the bolometers with carbon nanotubes by bringing carbon nanotubes into contact with an electrode containing a metal having lower work function than the carbon nanotube at least in a part of the electrode. In addition, not only resistance reduction but also high TCR in a broad voltage region was achieved by using a low proportion of a lower-work-function metal.

TABLE 1

Results of measurement of resistance values

| | Resistance value (3 V) |
|---|---|
| Comparative Example 1 | $3 \times 10^9$ |
| Example 1 | $4 \times 10^6$ |
| Example 2 | $8 \times 10^6$ |
| Example 3 | $1 \times 10^7$ |
| Example 4 | $3 \times 10^7$ |
| Example 5 | $2 \times 10^7$ |
| Example 6 | $7 \times 10^6$ |
| Example 7 | $3 \times 10^6$ |
| Example 8 | $6 \times 10^7$ |
| Example 9 | $9 \times 10^7$ |
| Example 10 | $5 \times 10^7$ |
| Example 11 | $7 \times 10^7$ |
| Example 12 | $6 \times 10^8$ |
| Example 13 | $4 \times 10^8$ |
| Example 14 | $2 \times 10^8$ |

TABLE 2

Results of measurement of average TCR within a voltage range of −3 V to +3 V

| | Average of absolute value of TCR (%/K) |
|---|---|
| Comparative Example 1 | 5.1 |
| Example 1 | 2.1 |
| Example 12 | 7.1 |

TABLE 2-continued

Results of measurement of average TCR within a voltage range of −3 V to +3 V

| | Average of absolute value of TCR (%/K) |
|---|---|
| Example 13 | 5.5 |
| Example 14 | 6.4 |

EXPLANATION OF REFERENCE

1 Substrate
2 First electrode
3 Bolometer film
4 Second electrode
5 Electrode on substrate (under CNT film)
6 Electrode on CNT film
7 APTES-CNT-coated part
8 Layer to prevent contact between electrode and carbon nanotubes (APTES layer)
a Metal having lower work function than carbon nanotubes
b Metal having higher work function than carbon nanotubes
c Alloy having lower work function than carbon nanotubes

The invention claimed is:

1. A bolometer-type infrared detector comprising:
two electrodes; and
a bolometer film lying between the two electrodes to connect the two electrodes,
wherein the bolometer film comprises semiconducting carbon nanotubes in a proportion of 90% by mass or more to the total amount of carbon nanotubes and comprises p-type semiconducting carbon nanotubes, and
wherein one or both of the two electrodes comprise(s) a monometal or alloy having lower work function than the p-type semiconducting carbon nanotubes at least in a part of the electrode.

2. The bolometer-type infrared detector according to claim 1, wherein the monometal or alloy having lower work function than the p-type semiconducting carbon nanotubes comprises at least one selected from the group consisting of titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

3. The bolometer-type infrared detector according to claim 1, wherein at least one of the two electrodes is composed of two or more metals.

4. The bolometer-type infrared detector according to claim 1,
wherein at least one of the two electrodes comprises the monometal or alloy having lower work function than the p-type semiconducting carbon nanotubes in a proportion of 10% by mass or less of the total amount of metals in parts where the bolometer film contacts, or
wherein the contact area between the monometal or alloy having lower work function than the p-type semiconducting carbon nanotubes and the bolometer film is 10% or less to the total contact area between the electrode and the bolometer film.

5. A bolometer-type infrared detector comprising:
two electrodes; and
a bolometer film lying between the two electrodes to connect the two electrodes,
wherein the bolometer film comprises n-type semiconducting carbon nanotubes, and
wherein one or both of the two electrodes comprise(s) a monometal or alloy having higher work function than the n-type semiconducting carbon nanotubes at least in a part of the electrode.

6. The bolometer-type infrared detector according to claim 5, wherein the monometal or alloy having higher work function than the n-type semiconducting carbon nanotubes comprises at least one selected from the group consisting of gold, platinum, copper, cobalt, nickel, carbon, and palladium.

7. The bolometer-type infrared detector according to claim 5, wherein at least one of the two electrodes comprises the monometal or alloy having higher work function than the n-type semiconducting carbon nanotubes in a proportion of 10% by mass or less of the total amount of metals in parts where the bolometer film contacts, or
wherein the contact area between the monometal or alloy having higher work function than the n-type semiconducting carbon nanotubes and the bolometer film is 10% or less to the total contact area between the electrode and the bolometer film.

8. The bolometer-type infrared detector according to claim 5, wherein at least one of the two electrodes is composed of two or more metals.

9. A method for producing a bolometer-type infrared detector comprising two electrodes and a bolometer film lying between the two electrodes to connect the two electrodes, the method comprising:
producing a bolometer film comprising semiconducting carbon nanotubes in a proportion of 90% by mass or more to the total amount of carbon nanotubes and comprising p-type semiconducting carbon nanotubes; and
producing two electrodes, before or after producing the bolometer film, in such a manner that the two electrodes connect to the bolometer film,
wherein one or both of the two electrodes comprise(s) a monometal or alloy having lower work function than the p-type semiconducting carbon nanotubes at least in a part of the electrode.

10. The method for producing a bolometer-type infrared detector according to claim 9, the method comprising:
subjecting a dispersion comprising carbon nanotubes and a surfactant to carrier-free electrophoresis to prepare a carbon nanotube dispersion comprising semiconducting carbon nanotubes and a surfactant;
producing a bolometer film with the carbon nanotube dispersion comprising the semiconducting carbon nanotubes and the surfactant; and
removing the surfactant from the bolometer film formed.

* * * * *